United States Patent Office 2,902,470
Patented Sept. 1, 1959

2,902,470
PHENOL MODIFIED POLYACETALS

Bernard H. Kress, Lafayette Hill, Pa., assignor to Quaker Chemical Products Corporation, Conshohocken, Pa., a corporation of Pennsylvania No Drawing. Application November 30, 1956
Serial No. 625,242

6 Claims. (Cl. 260—47)

The present invention relates to novel phenol modified polyacetals and to their preparation and uses. My phenol modified polyacetals differ in properties and in uses from phenol-aldehyde compositions known to this art because of the properties imparted by the polyacetal groups. Thus, my polyacetal compositions give rise to flexible resins of the thermosetting type which have not been capable of achievement heretofore. These resins in cured form are of light color, thus permitting the preparation of light or pastel colored coating compositions, molding compositions and the like. Because of good color, use of these compositions is practicable in the finishing of textiles. They are particularly useful in adhesive applications, especially as binding agents for cellulosic materials and rubber.

I may make my polyacetals by condensing a suitable reactive phenol with a suitable polyacetal by use of heat and catalyst, although the latter is not required in all cases. The polyacetals used for this purpose include aldehyde condensation products of alkylene and polyalkylene glycols possessing alkylene groups containing from 2 to 10 carbon atoms in a straight chain. Such glycols include, for example, ethylene, propylene, trimethylene, and butylene glycols, pentanediols, hexanediols, octanediols, decamethylene glycol and the like, diethylene, dipropylene, dibutylene glycols, triethylene, tripropylene and tributylene glycols, tetraethylene glycol and the like, and polyethylene, polypropylene and polybutylene glycols of molecular weights equal to about 200, 400, 1000, 1500 and 4000, such as polyethylene glycols and Carbowaxes made by Carbide and Carbon Chemicals Company.

The aldehydes which may be used in making these polyacetals include formaldehyde, acetaldehyde, propionaldehyde, butyraldehyde, crotonaldehyde, valeraldehyde, hexaldehyde, heptaldehyde and 2-ethyl hexaldehyde, or their polymers, precursors or simple acetals. Aromatic aldehydes, such as benzaldehyde and furfural are of use in these preparations. Substituted aldehydes, such as chloroacetaldehyde, hydroxy pivaldehyde and similar halogen and hydroxy substituted aldehydes or acetals may also be used. Aliphatic and aromatic dialdehydes may also be used. Thus, glyoxal, malonaldehyde, succinaldehyde, glutaraldehyde, adipaldehyde, terephthaldehyde and higher dialdehydes are useful. In addition, I may use their precursors such as dialkoxytetrahydrofuranes and alkoxydihydropyranes or the simple acetals of the dialdehydes in these reactions. Hydroxyaldehydes, such as hydroxyadipaldehyde are also useful in these preparations. In general, I may use any aldehyde containing from 1 to 8 carbon atoms in monomeric form, including heterocyclic aldehydes such as furfural, methyl furfural, ethyl furfural and the like, or carbocyclic aldehydes such as tetrahydrobenzaldehyde and the corresponding hexahydro compounds. Phenols useful in these preparations include phenol, cresols, xylenols, dihydroxy benzenes such as resorcinol, hydroquinone, and catechol, orcinol, pyrogallol, phloroglucinol, hydroxyquinol, dihydroxy diphenyls, para-isopropylidenediphenol, alpha and beta-naphthol, hydroxy anthraquinone and dihydroxy anthraquinone and the like. Alkyl substituted phenols and aromatic substituted phenols can be used. Thus, t.amyl phenol, nonyl phenol, tridecyl phenol, octadecyl phenol, pentatriacontyl phenol and cardanol derived from cashew nut shell oil can be used in making my condensation products. Similarly p-phenyl phenol is of value in obtaining water-insoluble products. In general, I may use any phenol containing a single or a plurality of aromatic nuclei bearing at least one hydroxyl group and one or more side chains containing from 1 to 35 carbon atoms. Phenol derivatives such as eugenol, isoeugenol and the like may also be used.

Further details of my invention will be apparent from the following illustrative examples. My phenol modified polyacetals may be prepared by several different methods. For example, I may first prepare suitable intermediate polyacetals as disclosed in my co-pending application Serial No. 403,056 filed January 8, 1954, now Patent No. 2,786,081. These acetals are then modified with a suitable reactive phenol to produce the products of this invention. The intermediate acetals designated as products A to E hereinafter were first prepared as follows, the reactants being given in parts by weight:

INTERMEDIATE PRODUCT A

| | Parts |
|---|---|
| Diethylene glycol | 106 |
| Paraformaldehyde (91%) | 33 |
| Sulfuric acid (99%) | 0.1 |
| Toluene | 20 |

These compounds were heated under reflux with a moisture trap inserted between the flask and the reflux condenser. After 18 parts of water of reaction were withdrawn from the reaction mixture, it was heated in vacuo with agitation to remove toluene. Under conditions of 20 mm. of mercury and at temperatures up to 150° C. no volatile organic condensation product was obtained. The resulting product was then neutralized with dilute NaOH solution to a pH of 7. The resulting intermediate acetal condensation product was completely soluble in water and in toluene. It had a faint ethereal odor and was somewhat viscous. It was free of formaldehyde odor under normal room conditions. The product had a molecular weight of 480 (Rast) and a hydroxyl equivalent of 220 which indicates it had a linear polymeric structure. It had a specific gravity of 1.155 at 34.5° C. The refractive index was $N_D^{30} = 1.462$. The molecular weight and hydroxyl equivalent of the condensation product of this product indicate that it possesses a polymeric structure, containing an average of four diethylene glycol units, as shown in the following formula:

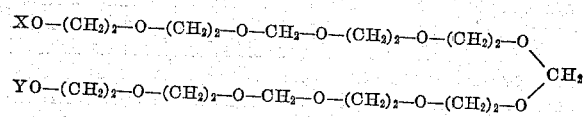

where X and Y may be either H or —CH$_2$OH.

If desired, the polymeric chains of these products may be terminated, either in whole or in part, by means of an alkyl radical. The alkyl radical may be introduced in any suitable manner. I may, for example, co-react an aldehyde and a glycol in the presence of a minor amount of a half ether of a glycol to serve as a chain stopper. Such a preparation is illustrated in the following product:

INTERMEDIATE PRODUCT B

| | Parts |
|---|---|
| Diethylene glycol | 101 |
| Beta methoxyethanol | 4 |
| Paraformaldehyde (91%) | 30 |
| Toluene | 20 |
| Sulfuric acid (99%) | 0.1 |

The above materials were reacted as under product A to yield a viscous liquid possessing a faint ethereal odor and soluble in water. Its polymeric nature was shown by Rast molecular weight determination which had a value of 637.

Mixtures of polyalkylene glycols may also be used to prepare these products.

INTERMEDIATE PRODUCTS C

| | Parts |
|---|---|
| Diethylene glycol | 85 |
| Dipropylene glycol | 27 |
| Paraformaldehyde (91%) | 33 |
| Toluene | 20 |
| Sulfuric acid (99%) | 0.1 |

These reactants were treated as under product A. The viscous liquid forms a crystalline mass below 0° C. The product is soluble in water or toluene and has a faint ethereal odor.

The glycols used in the preparation of these polyacetals may be replaced in part with minor amounts of polyhydric alcohols containing from 3 to 10 carbon atoms and from 3 to 6 hydroxyl groups, such as glycerine, trimethylol ethane, trimethylol propane, pentaerythritol, sorbitol, mannitol, butane triol, hexanetriol, alpha-methyl glucoside and dipentaerythritol. Such polyhydric alcohols may be used in quantities up to equimolar amounts of the glycol or polyglycol employed in preparing my polyacetals as shown in the following example:

INTERMEDIATE PRODUCT D

| | Parts |
|---|---|
| Diethylene glycol | 80 |
| Sorbitol—crystalline | 32 |
| Paraformaldehyde (91%) | 30 |
| Toluene | 20 |
| Sulfuric acid (99%) | 0.1 |

The product after treatment as under product A is a crystalline mass at room temperature, soluble in toluene and in water, and with virtually no odor.

Mixtures of aldehydes and dialdehydes may also be used to give the following product:

INTERMEDIATE PRODUCT E

| | Parts |
|---|---|
| Diethylene glycol | 106 |
| Paraformaldehyde (91%) | 52 |
| Glyoxal (30%) | 39 |
| Toluene | 20 |
| Sulfuric acid (99%) | 0.1 |

These were reacted as under product A. The product was a somewhat viscous yellow liquid with a faint ethereal odor. The product was soluble in water and in toluene.

The intermediate acetal condensation products A to E as previously described were then reacted with a suitable phenol to produce the products of my present invention as shown in the following examples:

Example 1

| | Parts |
|---|---|
| Intermediate product A | 80.5 |
| Phenol | 47 |
| Zinc chloride | 0.2 |

The mixture was heated with agitation at 170° C. for about an hour to yield a viscous light yellow product which was soluble in water.

Example 2

| | Parts |
|---|---|
| Intermediate product A | 59.5 |
| Water | 25.5 |
| Resorcinol | 55 |
| p.Toluene sulfonic acid | 0.4 |

The product was refluxed for half an hour; a viscous almost colorless liquid was obtained.

In a fashion similar to Example 1, the intermediate product A yields a viscous product upon reflux with nonyl phenol.

The condensation products of this invention may also be prepared by starting with the original reactants, i.e. a glycol, an aldehyde and a reactive phenol, with or without other modifiers, in order to obtain my phenol modified polyacetal products, as in the following illustrative example:

Example 3

| | Parts |
|---|---|
| Phenol | 47 |
| Diethylene glycol | 53 |
| Paraformaldehyde (91%) | 33 |
| Toluene | 30 |
| p.Toluene sulfonic acid | 0.3 |

The mixture was refluxed until 15 parts of water was removed azeotropically. The toluene was evaporated in vacuo to leave a viscous almost water-white liquid.

The products of Examples 1 to 3 have many valuable uses. Thus, they may be used in imparting hand and dimensional control to cellulosic fabrics as shown below.

Example 4

A padding solution was made up as follows:

5.0% condensation product described in Example 1
0.75% zinc chloride
2.25% diglycolic acid
92.0% water A light-weight rayon challis material which had been bleached and scoured was marked with a "Sanforize Test Marker." The fabric was then passed through the padding solution and rolls twice. The padder was adjusted for 100% wet pickup. The fabric was then placed on a frame so as to hold it to the dimensions it possessed before impregnation and dried in a hot air oven at 82° C. The fabric was then cured at temperatures of 145° C. for 5 minutes. The treatment was repeated on another sample of challis with 5% of the product of Example 2. The following test results were obtained:

| Product | 1 Wash [1] Warp Shrinkage, percent | 1 Wash [2] Warp Tensile, Lbs. | |
|---|---|---|---|
| Ex. 6 | 0.0 | 31.0 | Full hand. |
| Ex. 7 | 0.1 | 33.3 | Do. |
| Untreated | 8.1 | 43.3 | Limp. |

[1] AATCC 1952, 14-52.
[2] Fed. Spec. CCC-T-1918—Method 5102—2" width.

Example 5

The product of Example 1 in 10% concentration was applied to rayon challis along with 0.75% zinc chloride and 2.25% diglycolic acid in the same manner as in Example 4 and cured in the same manner. The fabric so treated showed zero percent shrinkage and 36 lbs. warp tensile strength when compared with an untreated fabric which showed 9% shrinkage and a warp tensile strength of 42 lbs.

Example 6

The product in Example 3 was cured in an oven at

250° F. for an hour to yield a rubbery transparent product suitable for use as an adhesive in bonding cellulosic fabrics and rubber.

Another use of my phenol modified polyacetals is their application in treating cellulosic tire cord in any stage of its manufacture in order to obtain superior adhesion to rubber. Additionally dimensional control and limited swelling of the tire cord so treated is of value in increasing the life of the tire.

The following example is illustrative of such treatment:

Example 7

The product of Example 2 was incorporated in a finishing bath of the conventional type used for treatment of viscose yarn. The concentration of the resorcinol and the period of immersion of the yarn were adjusted so that the yarn after drying in the usual manner contained 1 percent of resorcinol. The treated yarn was then doubled to form a 2/1650 denier cord and heated in an oven for 30 minutes at 125° C. in order to dry the cord and to cure the polymeric acetal. The cord was made up into a weftless fabric, coated with a layer of vulcanizable rubber compound by calendering and vulcanized in the usual manner.

The phenolic modified polyacetals of this invention are also suitable for use in coating compositions, laminating compounds, molded and extruded plastics, printing ink formulations, adhesives, magnet wire coatings, impregnating compositions for paper, vulcanized fiber and other porous sheet materials, ion exchange media and, in general, to a wide variety of uses known to the art of phenolic resins where the unique flexibility of cured phenolic-modified polyacetals makes their application invaluable. My polyacetals are particularly effective for treating cellulosic materials, such as natural cellulose, regenerated cellulose, hydrolyzed cellulose acetate, paper and paper fibers, regenerated cellulose fibers, jute, hemp and the like.

I claim:

1. A phenol modified polyacetal condensation product comprising the reaction product of a previously prepared acetal prepared by reacting at elevated temperatures in the presence of an acidic catalyst at least one alkylene glycol selected from the group consisting of monoalkylene and polyalkylene glycols in which the alkylene radical has 2 to 10 carbon atoms in a straight chain and at least one aldehyde selected from the group consisting of aliphatic, carbocyclic, and heterocyclic reactive aldehydes containing from 1 to 8 carbon atoms in monomeric form, with at least one reactive phenol selected from the group consisting of phenols having one to three aromatic nuclei bearing one to three hydroxyl groups and hydrocarbon substituted phenols in which the hydrocarbon radical contains 1 to 35 carbon atoms, said condensation product containing per molecule at least two polyoxyalkylene radicals derived from said alkylene glycol and at least two alkylidine radicals derived from said aldehyde.

2. A phenol modified polyacetal condensation product as defined in claim 1, modified by at least one polyhydric alcohol containing from 3 to 10 carbon atoms and from 3 to 6 hydroxyl groups.

3. A phenol modified polyacetal condensation product comprising the reaction product of a previously prepared acetal prepared by reacting at elevated temperatures in the presence of an acidic catalyst diethylene glycol and formaldehyde with phenol, said condensation product containing per molecule at least two polyoxyalkylene radicals derived from said glycol and at least two alkylidine radicals derived from said aldehyde.

4. A phenol modified polyacetal condensation product comprising the reaction product of a previously prepared acetal prepared by reacting at elevated temperatures in the presence of an acidic catalyst diethylene glycol and formaldehyde with resorcinol, said condensation product containing per molecule at least two polyoxyalkylene radicals derived from said glycol and at least two alkylidine radicals derived from said aldehyde.

5. A phenol modified polyacetal condensation product comprising the reaction product of a previously prepared acetal prepared by reacting at elevated temperatures in the presence of an acidic catalyst a dialkylene glycol in which the alkylene radical has 2 to 10 carbon atoms in a straight chain and at least one aldehyde selected from the group consisting of aliphatic, carbocyclic, and heterocyclic reactive aldehydes containing from 1 to 8 carbon atoms in monomeric form, with at least one reactive phenol selected from the group consisting of phenols having one to three aromatic nuclei bearing one to three hydroxyl groups and hydrocarbon substituted phenols in which the hydrocarbon radical contains 1 to 35 carbon atoms, said condensation product containing per molecule at least two polyoxyalkylene radicals derived from said glycol and at least two alkylidine radicals derived from said aldehyde.

6. A cellulosic material treated with a phenol modified polyacetal condensation product as defined in claim 1.

References Cited in the file of this patent

UNITED STATES PATENTS

| | | |
|---|---|---|
| 2,128,894 | Bond | Sept. 6, 1938 |
| 2,293,805 | Cooke et al. | Aug. 25, 1942 |
| 2,366,738 | Loder et al. | Jan. 9, 1945 |
| 2,401,776 | Rothrock | June 11, 1946 |

FOREIGN PATENTS

| | | |
|---|---|---|
| 620,565 | Great Britain | Mar. 28, 1949 |
| 696,105 | Great Britain | Aug. 26, 1956 |